United States Patent
Svenning et al.

[11] Patent Number: 5,265,066
[45] Date of Patent: Nov. 23, 1993

[54] SEISMIC CABLE

[75] Inventors: Bjornar Svenning, Trondheim; Eivind Berg, Ranheim, both of Norway

[73] Assignee: Den norske stats oljeselskap a.s, Stavanger, Norway

[21] Appl. No.: 849,061
[22] PCT Filed: Oct. 22, 1990
[86] PCT No.: PCT/NO90/00157
§ 371 Date: Apr. 27, 1992
§ 102(e) Date: Apr. 27, 1992
[87] PCT Pub. No.: WO91/06877
PCT Pub. Date: May 16, 1991

[30] Foreign Application Priority Data

Oct. 26, 1989 [NO] Norway .................. 894261

[51] Int. Cl.⁵ .............................. G01V 1/38
[52] U.S. Cl. ....................... 367/20; 367/154
[58] Field of Search .......... 367/20, 153, 154, 15, 367/16; 174/101.5; 181/402; 439/284

[56] References Cited

U.S. PATENT DOCUMENTS

| | | | |
|---|---|---|---|
| 3,713,085 | 1/1973 | Laurent et al. | 340/7 |
| 3,939,464 | 2/1976 | Svenson | 367/20 |
| 3,987,404 | 10/1976 | Woodruff | 340/6 R |
| 4,323,988 | 4/1982 | Will et al. | 367/4 |
| 4,500,980 | 2/1985 | Copeland | 367/154 |
| 4,725,990 | 2/1988 | Zibilich, Jr. | 367/15 |
| 4,870,625 | 9/1989 | Young | 367/16 |
| 4,920,523 | 4/1990 | Kruka et al. | 367/188 |
| 4,953,136 | 8/1990 | Kamata et al. | 367/25 |

FOREIGN PATENT DOCUMENTS 1498958 1/1978 United Kingdom .
2083221 3/1982 United Kingdom .

*Primary Examiner*—Ian J. Lobo
*Attorney, Agent, or Firm*—Foley & Lardner

[57] ABSTRACT

A marine seismic seabed cable for use on or near the seabed includes at least one pulling cable, a data cable, and a sleeve which surrounds the data cable and the pulling cable. Groups of geophones and position metering instruments are placed along the cable with the position metering instruments and geophones being disposed in a geophone sphere. The geophone sphere and the pulling cables are to a substantial degree mechanically isolated from each other so that, for example, shocks and signals against the seabed cable will only be transferred to a minor extent to the geophone sphere.

11 Claims, 8 Drawing Sheets

SEISMIC CABLE

TECHNICAL FIELD

The present invention relates to a marine seismic sea-bed cable and a method for the execution of marine exploration of the kind indicated in the introduction to the main claims. Generally, the invention concerns seismic exploration of the substratum at sea, where pressure waves and shear waves from the substratum are measured in response to the release of pressure and shear energy.

BACKGROUND ART

Marine seismic explorations are usually carried out by a seismic cable provided with several hydrophones being towed at a certain depth. Pressure waves can be released near the cable in several ways. This usually takes place by means of air guns. The pressure wave energy moves downwards through the substratum, but parts of the pressure waves are reflected from areas where there are acoustic impedance characteristics in the substratum. Hydrophones register the reflected pressure waves in the water and transform this information to electric signals which are received and processed on the seismic ship which tows the cable. Using this method, only reflected or converted shear to pressure energy is recorded. However, it is known that down in the substratum both pressure waves and shear waves are reflected. The shear waves do not travel in water and therefore cannot be detected by a hydrophone cable.

In U.S. Pat. No. 4,725,990, a marine shear cable is suggested, which is dragged along the seabed and which is provided with geophones. The cable is supposed to detect shear forces, but it has several disadvantages and weaknesses. During employment it will firstly be problematic classifying pressure waves which are reflected from the sea's surface. Secondly, all of the components are enclosed in a sleeve, which causes blows against the cable to travel to the geophones. Nor will the geophones achieve the desired contact with the sea bed. Furthermore, only one-component data is measured.

DISCLOSURE OF INVENTION

The aim of the present invention is to provide a new and improved cable for measurement of both shear waves and pressure waves.

The new and distinctive characteristics of the invention are described in the characterizing part of the main claims. Further advantageous characteristics are disclosed in the dependent claims.

BRIEF DESCRIPTION OF DRAWINGS

The invention will be more closely described in the following, with reference to the accompanying drawings where.

MODES FOR CARRYING OUT THE INVENTION

Figure 1A:
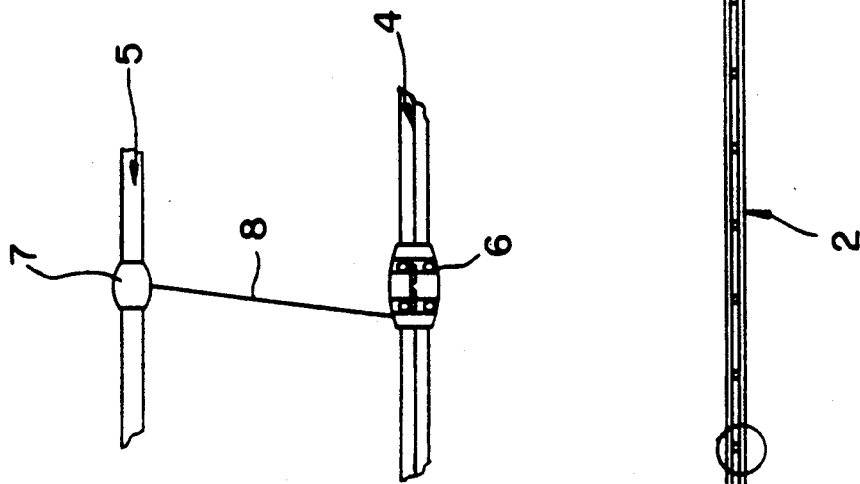
FIG. 1A is a detailed view of the circled portion in FIG. 1.
Figure 1:
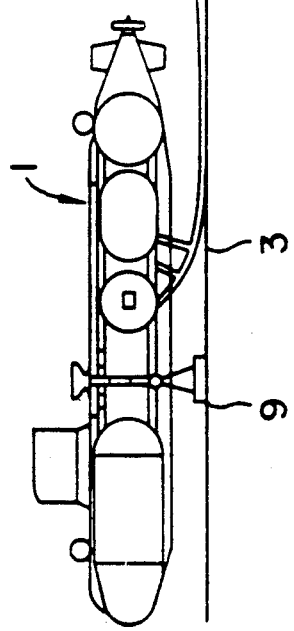
FIG. 1 illustrates usage of a sea-bed cable during the carrying out of a seismic exploration according to the invention.

In FIG. 1 an underwater vessel 1 is shown, which tows a seismic cable 2 along the sea-bed 3 for seismic exploration of the substratum beneath the sea-bed. Such a cable will be rather long, often 2-3 kilometers. According to the embodiment of the invention shown in FIG. 1A, the seismic cable 2 comprises two parallel cables; a lower geophone cable 4 and an upper hydrophone cable 5. The geophone cable 4 is towed along the bed 3 with which it is to have optimum contact, whilst the hydrophone cable 5 floats at a predetermined distance above the geophone cable 4. Cable spheres 6 containing geophones are plated along the geophone cable 4 at constant intervals. The cable spheres 6 will be relatively heavy and make good contact with the bed.

In the area above each cable sphere on the geophone cable 4, a hydrophone element 7 will be placed on the hydrophone cable 5, the purpose of which will be described later. The hydrophone cable 5 is moreover of a type which is well known and commercially available. Hydrophones can also be arranged in simple floating elements which are fastened to the geophone cable with individual cable of known length.

In order to ensure a definite distance between each cable sphere 6 and the hydrophones 7 a spacer 8 is arranged at each cable sphere 6.

In FIG. 1 an underwater vessel 1 is shown as a seismic ship, which in many ways will be advantageous compared with a surface vessel. There will be no dependence on weather and there will be no transmission of movement against the cable 2 as a result of wave-influence on the ship. Positioning of the cable 2 will also be easier. In pulling out the cable it will be unnecessary to raise it from the seabed. In this way, the geophone cable will work itself down into the sea bed and achieve good contact. In sea areas where the bed is hard, it may be necessary to equip the foremost end of the cable with a tool which can make a ditch in the sea bed. Such a tool can be a plough or a chain which is mounted between the tow-vessel and the geophone cable. It is not however a condition of the invention that an underwater vessel 1 is used, although it is a part of a preferred concept.

The seismic ship will be provided with a source 9 for generating wave energy down into the substratum near the cable 2. The wave energy source can come from many known types of generator. Air cannon, which is the most usual source in marine surface seismology is a possibility, although it generates "secondary sources" (bubble effects) which will increase with increasing sea depth. Explosive sources is another well tried source of energy which gives very good results. The explosives can be laid out on the sea bed or drilled into the formation.

In using an underwater vessel 1, a marine sea-bed vibrator will be particularly advantageous. A modified edition of existing vibrators can be used, where it is pressed against the sea bed and functions as land seismic vibrators in operation. For softer sea bed conditions, it can be appropriate to cause under-pressure in the vibrator shoe so that it adheres to the sea bed. When the picture or pulse generation has ceased, the pressure in the vibrator shoe is increased so that it is released from the sea bed. This method of operation will, using free-floating or light underwater vessels, increase productivity substantially, as compared with for example, ballasting.

The advantage of placing a vibrator on the sea bed is that it is possible to make a greater part of the energy penetrate down into the sea bed and also for control and flexibility of the transmitted source signatures.

By placing a vibrator source on the sea-bed, it is also possible to generate shear waves. This can be done in several ways. A suitable way is to hove two vibrators which will generate pressure waves when they operate in-phase and shear waves in counter-phase. By using several vibrators, polarization of the transmitted signals will be achieved.

In the following, a seismic exploration according to the invention will be described.

Figure 2:
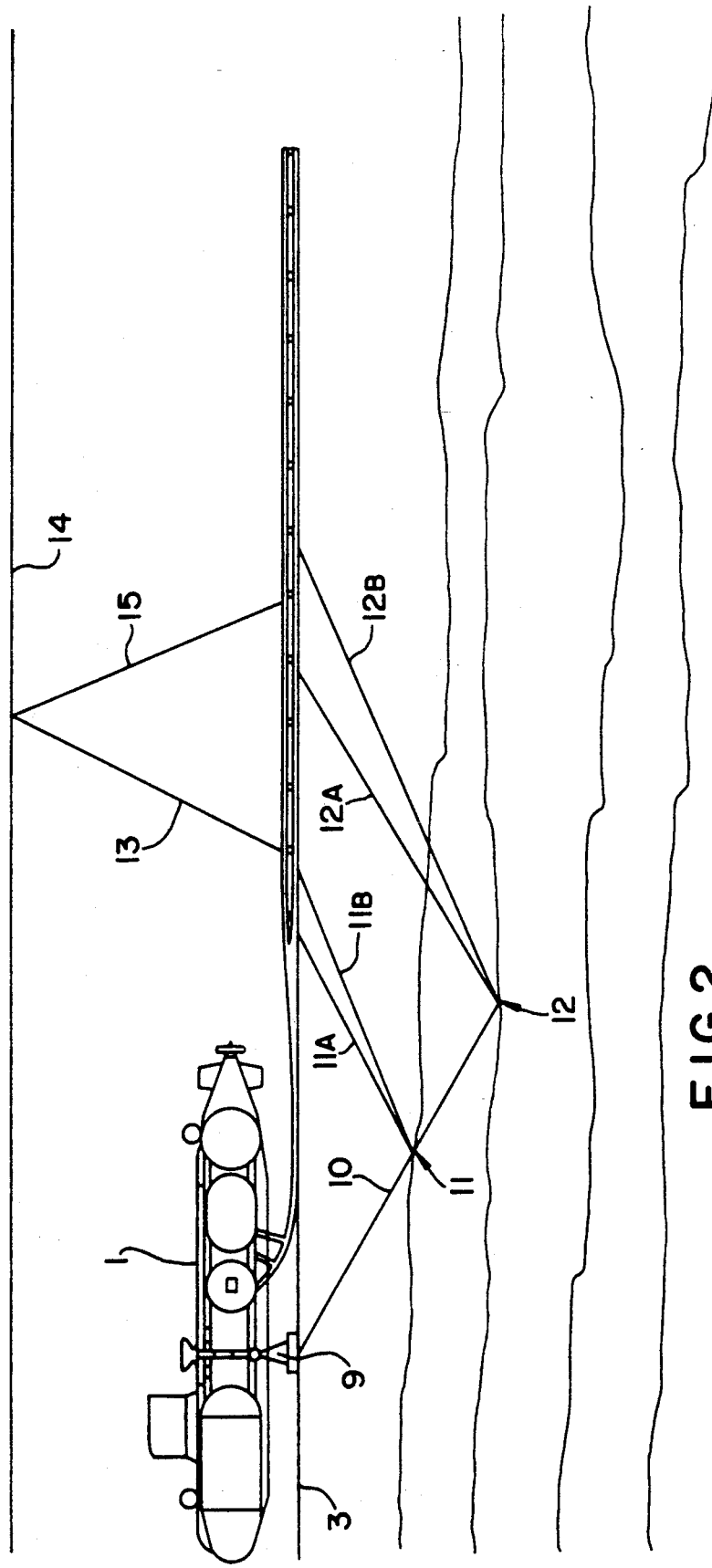
FIG. 2 illustrates execution of a seismic exploration.

A pressure wave or camined pressure and shear wave is generated from a source 9 and travels from the sea bed 3 and down into the substratum. In areas where there is variation in acoustic impedance between the layers in the formation, for example the points 11 and 12, part of the wave will be reflected upwards as pressure and shear waves. They are indicated in FIG. 2 as wave 11a, 11b and 12a, 12b from the points 11 and 12 and the waves are registered by the geophones and hydrophones. The shear waves do not travel in water and will stop at the sea bed where they will convert into pressure waves. The pressure waves will travel further upwards, in FIG. 2 illustrated as wave 13, which will reach the water surface 14 where part of it will be reflected back towards the sea bed as wave 15. The aim of the hydrophone cable 5 is exactly to register the reflection waves from the surface so that when the collected data is processed, they can be filtered out. This filtering out is enabled to be done by having two measuring points of known orientation and distance.

As mentioned previously the hydrophone is placed in a hydrophone cable 5 in single elements of a known type. The suggested geophone spheres 6 on the geophone cable 4 are however new and are a part of the invention.

Figure 3:
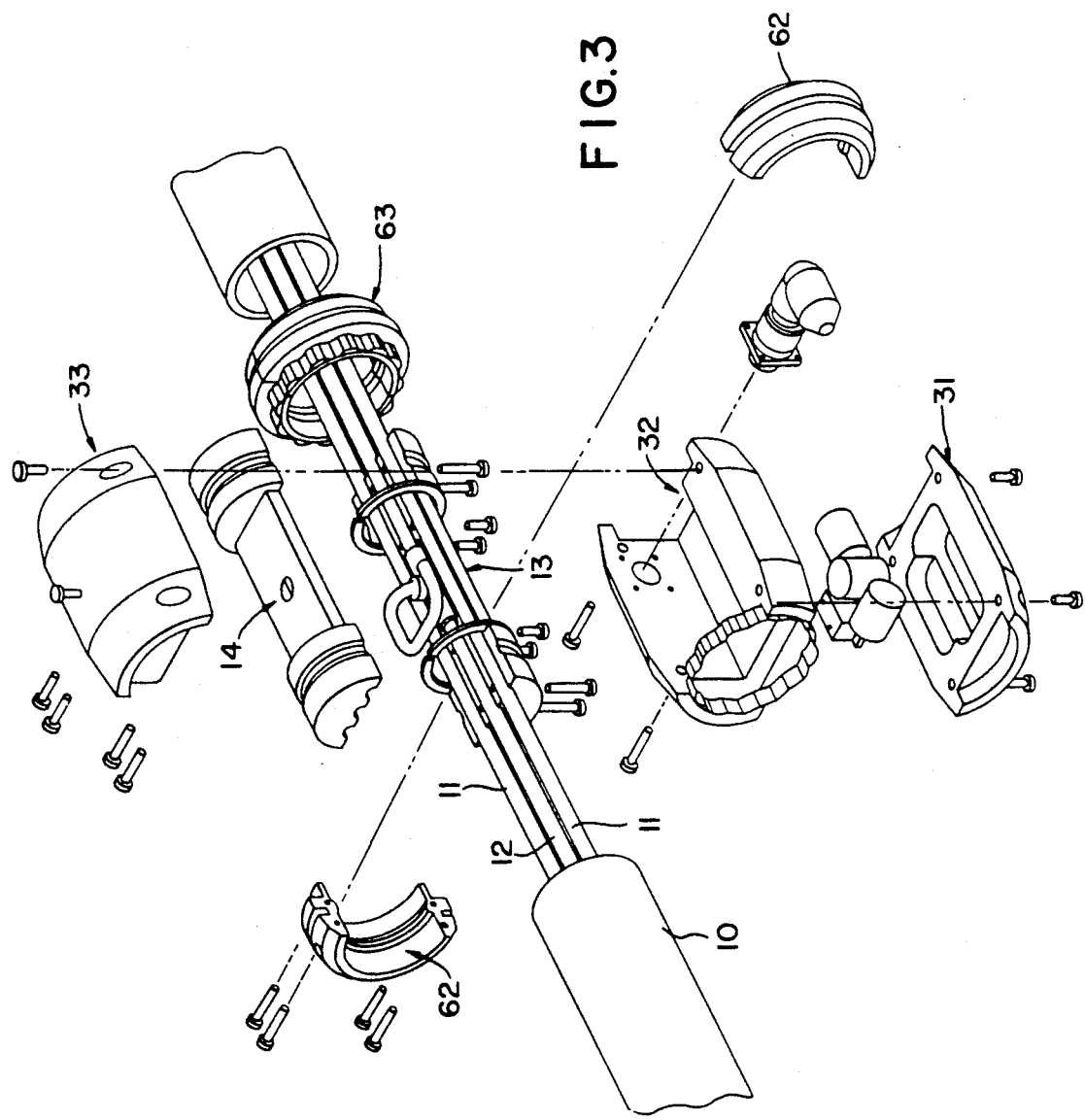
FIG. 3 shows an exploded overall view of the sphere of a geophone cable.
Figure 4:
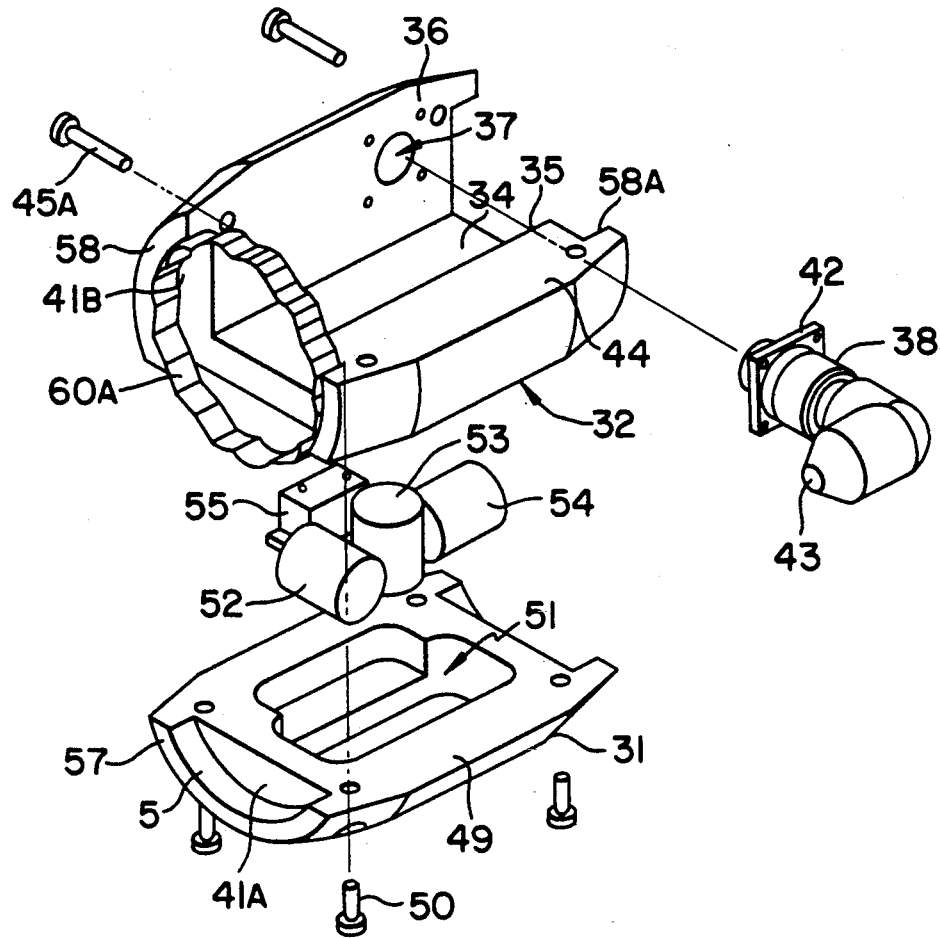
FIG. 4 shows a sketch of middle and lower ball part.
Figure 5:
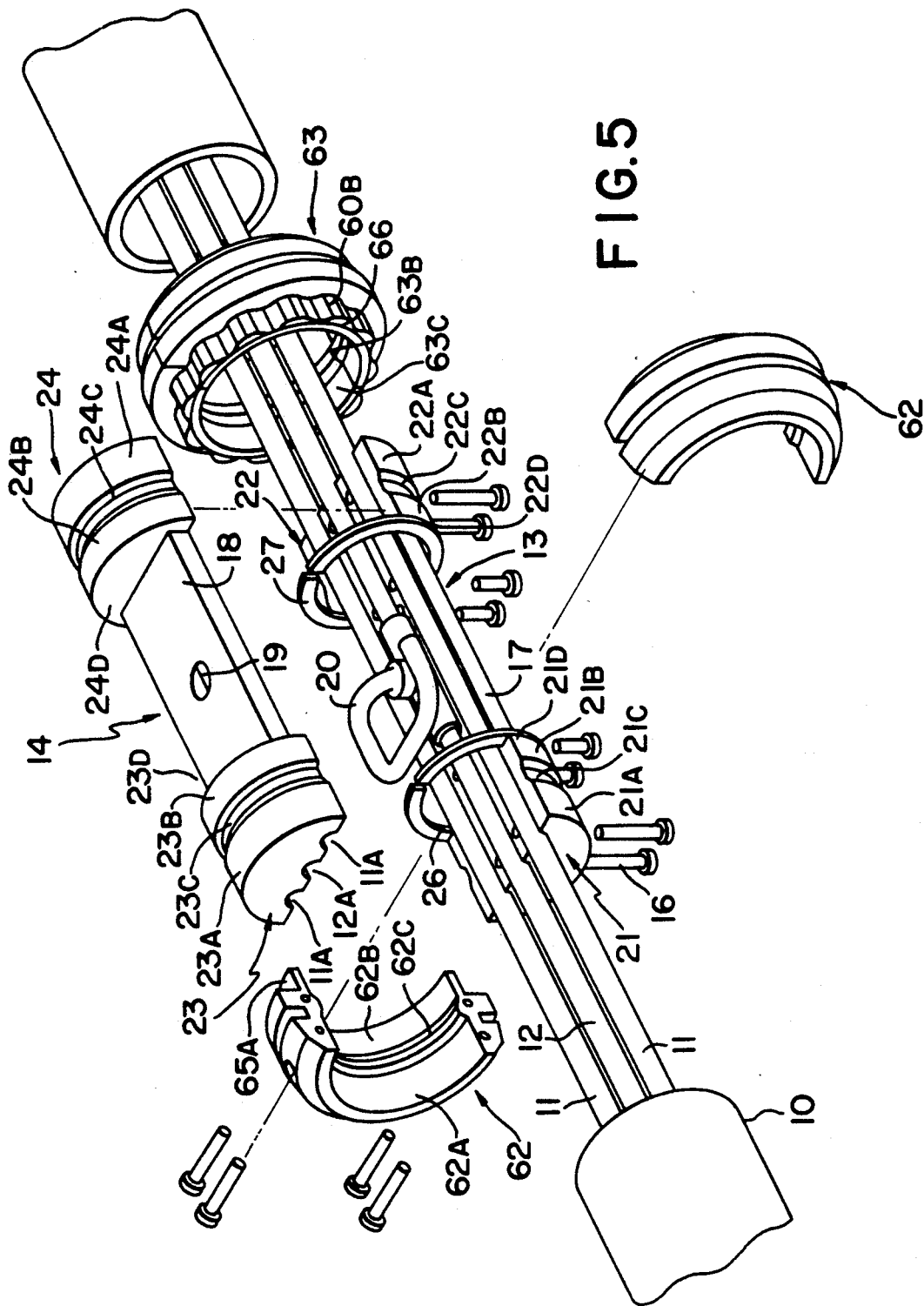
FIG. 5 shows a drawing of the clamping parts of the sphere.
Figure 6:
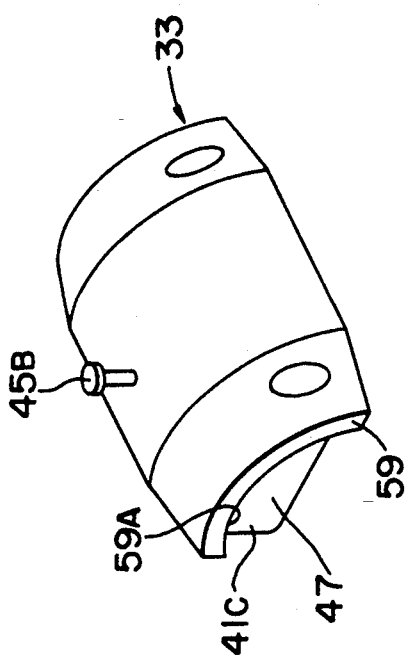
FIG. 6 shows a drawing of upper sphere part.

In FIG. 3 an exploded overall view of one of the geophone cable's 4 cable spheres 6 is shown and in the FIGS. 4–6 the various parts of the cable sphere are shown in larger scale. The geophone cable comprises a protective sleeve 10 and three cables inside this. The two outer cables will be pulling-cables 11, and the middle cable will be a data cable 12 for transmission of information back to the seismic ship 1.

The cables rest in a two-piece clamp, 13, 14 where, inside the clamp, a groove 11a, 12a for each cable is arranged. The lower clamp part 13 and the upper clamp part 14 are arranged in the shown embodiment to be fastened together by a bolt connection, shown in the figure by vertically directed clamp screws 16. The middle parts 17,18 are formed as rectangular plates, but with the mentioned cut-out or moulded grooves 11a, 12a for the cables respectively on the clamp parts' overside and underside. The middle area 18 of the upper clamp part 14 has an opening 19 for passage of a connecting wire 20 from the data cable 12. The end areas 21, 22, 23, 24 of the clamp parts 13, 14, which in assembled position will be cylindrically formed, comprise three surfaces 21a–24a and inner surfaces 21b–24b along the length of the cable, and moreover steering grooves 21c–24c adapted to a cam in an outside clamp, which will be described later. The vertical surfaces 21d–24d on the cylindrical end parts' inner-facing sides are adapted to be able to hold two splittable wave rings 26, 27. The function of the wave rings 26, 27 will be described later.

The actual cable sphere 6 is divided into three and comprises a lower part 31 where geophones are placed, a middle part 32 through which the cables 11, 12 run and an upper part 33 which is virtually a cover for the middle part.

The middle part of the cable sphere comprises an internal cavity with rectangular floor 34 and two vertical walls 35, 36 extending along the length of the cable.

The internal clamp's plate part 13, 14 will be placed inside the cavity, but in such a way that the clamp is mechanically insulated against transmission of blows to the cable sphere. In one of the walls 36 a channel 37 is arranged for a not shown cable to, for instance, the geophones.

Figure 7:
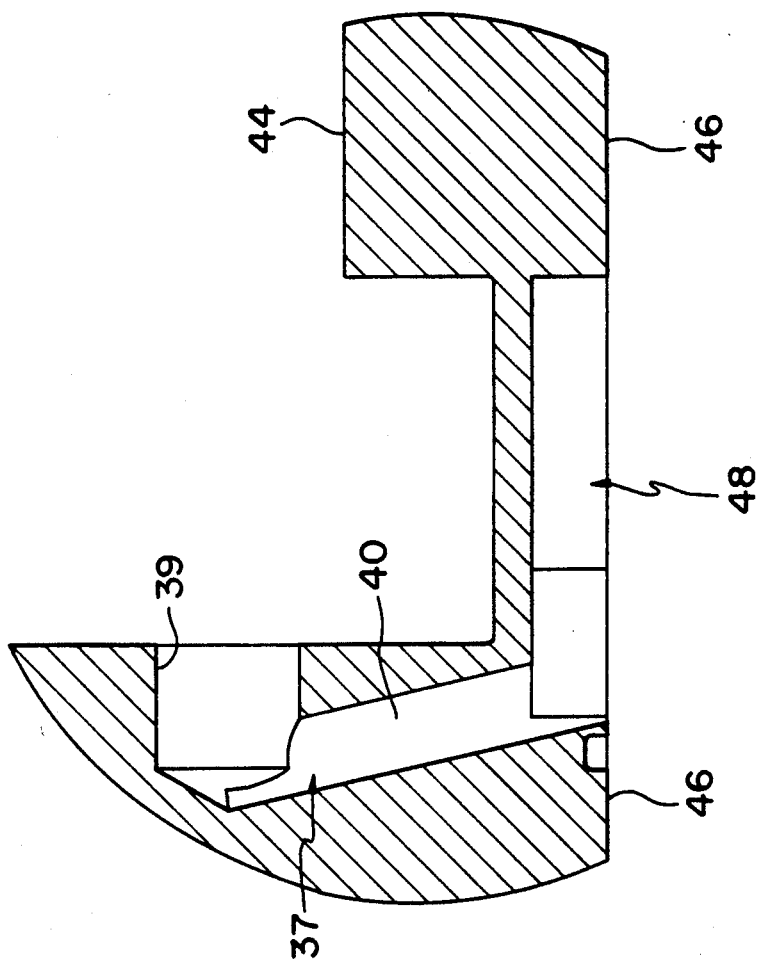
FIG. 7 shows a section through middle geophone ball part.

On the cross-section in FIG. 7 there is shown in detail how the channel 37 can be designed with a horizontal inlet 39 wherein a connector 38 is placed and with a downwardly facing channel 40 to the underside 32 of the middle cable sphere part. The not shown signal cable is connected to the end of the connector and extends through the channel 37 and down to e.g. the geophones. The connector 38 will preferably be provided with a flange 42 which can be screwed fluidproof fast to the wall 36 and will at its free end 43 be adapted to connect with the connecting wire 20. The connector 38 as such is previously known and commercially available.

The external faces of the walls of the middle sphere part 32 comprise segments in the sphere part's approximately cylindrically and partly conically formed outer surface. The one wall 36, which contains the channel 37, is in the shown embodiment considerably higher than the other wall 35. The short wall 35 has a horizontal abutment surface 44 while the high wall has a vertical flat surface, both adapted to be coupled together with corresponding abutment surfaces on upper sphere part 33. The outer face of upper sphere part 33 covers upper part of the walls' outer surfaces. To connect the parts, bolt-connections are used in the form of respectively horizontal screws 45a and vertical screws 45b.

The underside of the middle sphere part comprises, as is partly evident from FIG. 4, a horizontal, downwardly facing contact surface 46 along the circumference. On the inside of the contact surface 46 there is a cavity 48 into which the previously mentioned channel 40 leads.

Lower sphere part 31 comprises a corresponding upward-facing horizontal contact surface 49 which can be connected to the underside of the middle sphere part by means of a screw connection, illustrated in FIG. 3 in the form of vertical screws 50. Lower sphere part 31 comprises further a closed cavity 51 which has a geometric shape which corresponds with the shape of the cavity 48 on the underside of middle sphere part 32 and which in mounted position becomes an extension of this cavity, in the following called the geophone cavity 48, 51.

Firstly, in the geophone cavity 48, 51, three geophones 52, 53, 54 are placed, orientated in an x,y and z direction. Secondly, a rotation and inclination meter 55 (inclinometer) is comprised. The geophones 52, 53, 54 and the rotation and inclination meter 55 are connected to the cable 12 via the wire which extends through the canal 37 of the middle sphere part. In a preferred embodiment, the geophones 52, 53, 54 and the rotation and inclination meter 55 can be moulded in the geophone cavity 48, 51 by means of a polymer material. The geophone cavity 48, 51 is as mentioned closed and shear and pressure waves can travel by the cable sphere moving at the same rate as the surrounding medium.

The geophones 52, 53, 54 and the rotation and inclination meter 55 are basically known and commercially available products.

Upper sphere part, as mentioned previously, is a kind of cover for middle cable sphere's cavity. In addition to having an outer surface which completes middle sphere part's outer faces, upper sphere part 33 comprises two transversal walls 47 which close at each end of upper sphere part's cavity.

As will be apparent from the figures the wall thickness in the cable sphere 6 is quite considerable in order to give the sphere a heavy weight and thereby ensure good contact with the sea-bed. The cable sphere is preferably made of a metallic material, preferably steel.

In the following, arrangement and mounting of the sphere component 6 in relation to inner clamps 13, 14 and throughrunning cable 11, 12 will be more closely described.

As mentioned earlier the cable sphere 6 is mechanically isolated from the actual cable.

In order to insulate against blows and transmissions of movement along the length of the cable, wave rings 26, 27 are mounted which differ from ordinary plane rings in that they have a wave shape in the axial direction. The wave rings 26, 27 are preferably made of an elastic metal, for example spring steel. The other surface of the wave rings is mounted against the end portions 41a–41c of the sphere parts. Axial shocks in the cable will be subdued by the wave rings.

At each end, the cable sphere parts 31, 32, 33 have an outwardly facing collar 57, 58, 59 which have a radially inward-facing bearing surface 57a–59a for accommodation of a wave shaped spring 60a, b. At each end external outer clamps divided into two 62, 63 are placed. In FIG. 7 they are shown both separate at clamp 62 and assembled at clamp 63. The outer clamps 62, 63 comprise internally an axially outward-facing surface 62a, 63a, an axially inwardly facing surface 62b, 63b and cams 62c, 63c arranged in between these. The cam 62c, 63c is adapted to the groove 21c–24c in the inner clamp. The end of the cable sleeve 10 can, in a preferred embodiment, be pressed between the outer face of the clamp 21a–24a and the outer fare 62a, 63a of the outer clamp.

The outer clamps 62, 63 will have, externally, along the length of the cable, an inwardly facing gradation which comprises a shoulder 65a, 65b. The inner side of the previously mentioned wave springs 60a, 60b is designed to be placed on the shoulder 65a, 65b, as shown in the outer clamps 63 assembled together in FIG. 3. The function of the wave springs 60a, 60b is to absorb and prevent radial shocks from the cable from travelling to the cable sphere 6. This is achieved by using a cylindrical spring which is wave shaped in the radial direction. Such a wave spring will act approximately as several independent springs placed in a corresponding annulus. The wave springs are preferably made of an elastic, metallic material, preferably spring steel. The external surface of the outer clamps 62, 63 will incidentally only be an extension of the outer surface of the cable sphere and adapted to this. It is preferable that the outer clamps 62, 63 and also partly the end parts of the cable sphere are conically narrowing off towards the changeover to the cable. The middle part of the cable sphere 6 will be cylindrically shaped. This is to ensure that the cable spheres shall become hooked up as little as possible when the cable is dragged along the sea bed.

The two halves of the outer clamps are preferably mounted together by means of a screw connection, indicated in FIG. 7 as horizontal screws.

Figure 8:
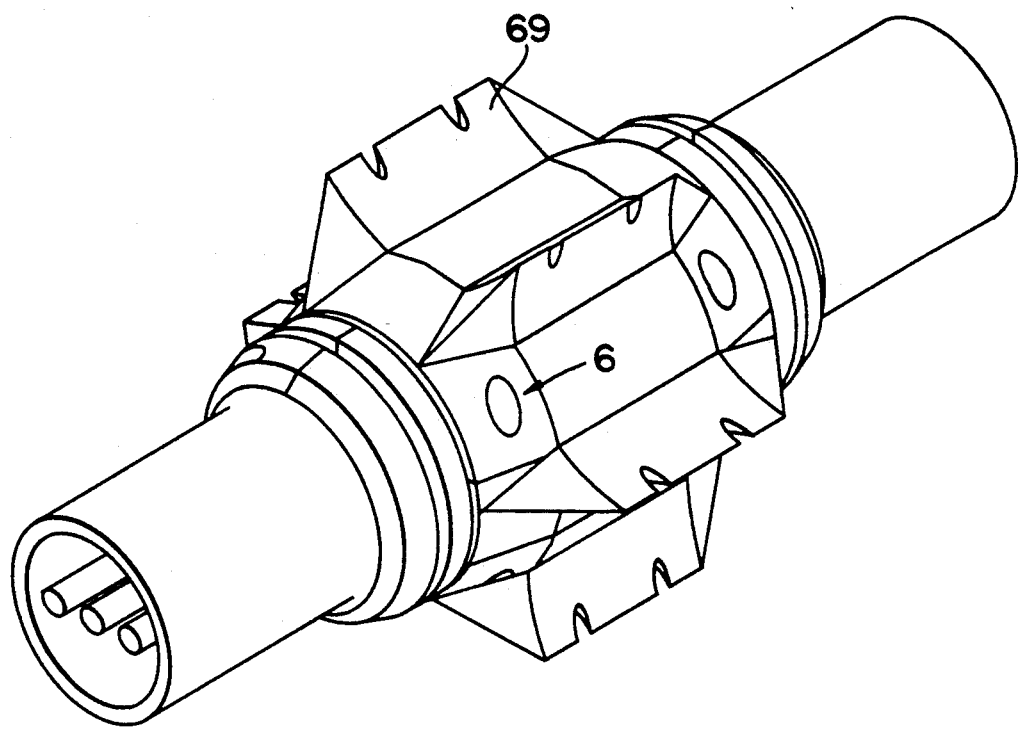
FIG. 8 shows the sphere equipped with fins.

In order to further ensure that each cable sphere shall achieve a good contact with the sea bed, it can be provided with fins 69 as illustrated in FIG. 8. The fins 69 will, particularly where the bed is soft, penetrate down into the sea bed, which will especially be of importance for detection of wave movements at horizontal level in the sea bed.

We claim:

1. A marine seismic cable (2) for use on or near the sea bed (3) including one or more pulling cables (11), a data cable (12), a sleeve (10) which surrounds the pulling cables and the data cable, positioning metering instruments, and groups of geophones placed in cable spheres behind each other along the cable, characterized in that
    each cable sphere comprises an inner clamp (13,14) for through running of the cables (11,12) and outer clamps (62,63) which connect the cable sphere and the sleeve (10),
    each group of geophones and the position metering instruments are placed in a lower sphere part of each cable sphere,
    a cylindrical spring (60a, 60b) which is wave-shaped in tis radial direction and which is placed on a shoulder (65, 66) on each of the outer clamps (62,63) and with the outer surface of the cylindrical spring (60a, 60b) resting against the inner side of an outwardly facing collar of the cable sphere for radial shock insulation,
    a ring (26, 27) which is wave-shaped in its axial direction and which is placed internally of and in contact with each of the end parts of the inner clamp (13,14) and on the outer side of the end surfaces of the cable sphere for axial shock insulation.

2. Marine seismic cable according to claim 1, characterized by the cable sphere comprising a middle sphere part (32) comprising a cavity with floor (34) and two walls (35, 36) through which the cables placed in the inner clamp (13, 14) extend, and an upper sphere part (33) for closing the cavity of middle sphere part (32).

3. Marine seismic cable according to claim 1, characterized in that lower sphere part coprising a cavity for geophones and position metering instruments is watertightly fastened to the underside of middle sphere part (32).

4. Marine seismic cable according to claim 3, characterized by the geophones and position metering instruments being moulded in the geophone cavity (48, 51) by means of a polymer material.

5. Marine seismic cable, according t claim 1, characterized in that the internal clamp comprises an upper clamp part (14) and a lower clamp part (13) which each include a plate formed middle part (17, 18), and semi-cylindrical end parts (21a, 21b, 22a, 22b) comprising in the axial direction an external surface (21a–24a), an internal surface (21b–24b), a guiding groove (21c–24c) between these and innermost a vertical surface (21d–24d) adapted for the accommodation of wave rings (26, 27).

6. Marine seismic cable, according to claim 1, characterized in that middle sphere part (32) comprises floor (34) and walls (35, 36) an din that on one of the walls (37) of the sphere part, a channel is arranged with inlet and terminal for one of the ends of a connector (38), whose other end is connected to a data cable (20), and where from the connector's (38) connecting end a signal cable extends via the channel (37) in middle sphere part (32) and to the geophones/position metering instrument (52-55).

7. Marine seismic cable according to claim 1, characterized in that it comprises two pulling cables (11) and a data cable (12) placed between these, that for each cable sphere point a data cable outlet (20) is arranged, and that the cables (11, 12) are held in mutual position at each cable sphere point by grooves (11a, 12a) in the inner clamp (13, 14).

8. Marine seismic cable according to claim 1, characterized by the cable sphere parts having at each end an outwardly facing collar (57-59) with an inwardly facing surface for contact with the wave shaped springs (60a, 60b).

9. Marine seismic cable according to claim 1, characterized in that the outer set of clamps (62, 63) which are divided into two comprise internally in the axial direction an outer surface (62a, 63a), an inner surface (62b, 63b), an elevation (62c, 63c) adapted to the grooves (21c-24c) of the internal clamp and externally a shoulder (65, 66) against which the wave spring (60a, 60b) rests.

10. Marine seismic cable according to claim 1, characterized in that the cable sphere, in mounted position, has a shape with a central cylindrical portion which, towards the end portions transforms into a conically narrowing portion and that the outer clamps also have as an extension a conically narrowing shape towards the cable.

11. Marine seismic cable according to claim 1, characterized by the cable sphere being provided with fins (69).

* * * * *